(12) United States Patent
Murray

(10) Patent No.: US 8,931,588 B2
(45) Date of Patent: Jan. 13, 2015

(54) ACOUSTIC PANEL

(71) Applicant: Rolls-Royce plc, London (GB)

(72) Inventor: Paul Benedict Murray, Horsham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 13/899,989

(22) Filed: May 22, 2013

(65) Prior Publication Data
US 2014/0090923 A1    Apr. 3, 2014

(30) Foreign Application Priority Data

May 31, 2012  (GB) .................................. 1209658.2

(51) Int. Cl.
*B64D 33/02* (2006.01)
*F02C 7/24* (2006.01)
*F02K 3/06* (2006.01)
*F02C 7/045* (2006.01)
*B64D 33/00* (2006.01)

(52) U.S. Cl.
CPC ... *F02C 7/24* (2013.01); *F02K 3/06* (2013.01); *F02C 7/045* (2013.01); *Y02T 50/672* (2013.01)
USPC .......... 181/214; 181/288; 181/292; 244/53 B; 415/119

(58) Field of Classification Search
USPC ................. 181/229, 214, 213, 288, 292, 250; 244/53 B, 1 N; 415/119
See application file for complete search history.

(56) References Cited

U.S. PATENT DOCUMENTS

| 3,439,774 | A | * | 4/1969 | Callaway et al. ............. 181/222 |
| 3,910,374 | A | | 10/1975 | Holehouse |
| 4,084,366 | A | | 4/1978 | Saylor et al. |
| 4,091,892 | A | * | 5/1978 | Hehmann et al. ............. 181/286 |
| 4,150,732 | A | * | 4/1979 | Hoch et al. .................... 181/213 |
| 4,235,303 | A | | 11/1980 | Dhoore et al. |
| 4,410,065 | A | | 10/1983 | Harvey |
| 4,421,201 | A | * | 12/1983 | Nelsen et al. ................. 181/214 |
| 4,531,362 | A | * | 7/1985 | Barry et al. ................... 60/226.1 |
| 4,645,032 | A | * | 2/1987 | Ross et al. .................... 181/250 |
| 4,749,150 | A | * | 6/1988 | Rose et al. .................... 244/53 B |
| 5,041,323 | A | * | 8/1991 | Rose et al. .................... 428/116 |
| 5,106,668 | A | * | 4/1992 | Turner et al. .................. 428/116 |
| 5,160,248 | A | * | 11/1992 | Clarke ............................... 415/9 |
| 5,344,280 | A | * | 9/1994 | Langenbrunner et al. ........ 415/9 |
| 5,543,198 | A | * | 8/1996 | Wilson .......................... 428/116 |
| 6,615,950 | B2 | * | 9/2003 | Porte et al. ................... 181/292 |
| 6,619,913 | B2 | * | 9/2003 | Czachor et al. ............... 415/119 |

(Continued)

FOREIGN PATENT DOCUMENTS

| EP | 1 336 739 A2 | 8/2003 |
| FR | 2 818 421 A1 | 6/2002 |
| GB | 2 252 075 A | 7/1992 |

OTHER PUBLICATIONS

Sep. 28, 2012 British Search Report issued in British Application No. GB1209658.2.

*Primary Examiner* — Edgardo San Martin
(74) *Attorney, Agent, or Firm* — Oliff PLC

(57) ABSTRACT

An acoustic panel includes a first cellular layer with cells having a first axis, a second cellular layer with cells having a second axis, and a perforated septum layer separating the first layer and the second layer. The cells of both layers have an end distal to the septum layer and an end which meets the septum layer, and the maximum diameter of the cells of the first layer is less than the maximum diameter of the cells of the second layer.

32 Claims, 4 Drawing Sheets

(56) References Cited

U.S. PATENT DOCUMENTS

| | | | |
|---|---|---|---|
| 7,331,421 B2 * | 2/2008 | Olsen et al. | 181/214 |
| 7,735,600 B2 * | 6/2010 | Strunk et al. | 181/210 |
| 7,779,965 B2 * | 8/2010 | Marze | 181/292 |
| 7,784,283 B2 * | 8/2010 | Yu et al. | 60/770 |
| 7,857,093 B2 * | 12/2010 | Sternberger et al. | 181/213 |
| 7,866,440 B2 * | 1/2011 | Douglas | 181/213 |
| 7,870,929 B2 * | 1/2011 | Farstad | 181/214 |
| 8,028,797 B2 * | 10/2011 | Douglas | 181/213 |
| 8,578,697 B2 * | 11/2013 | Harper et al. | 60/226.1 |
| 8,579,225 B2 * | 11/2013 | Mardjono et al. | 244/1 N |
| 2002/0157764 A1 * | 10/2002 | Andre et al. | 156/156 |
| 2006/0169532 A1 * | 8/2006 | Patrick | 181/210 |
| 2006/0169533 A1 * | 8/2006 | Patrick | 181/210 |
| 2008/0135329 A1 | 6/2008 | Strunk et al. | |
| 2010/0108435 A1 | 5/2010 | Valleroy et al. | |
| 2010/0284789 A1 * | 11/2010 | Brooks et al. | 415/119 |
| 2010/0284790 A1 * | 11/2010 | Pool et al. | 415/119 |
| 2012/0156006 A1 * | 6/2012 | Murray et al. | 415/119 |
| 2013/0126265 A1 * | 5/2013 | Sternberger et al. | 181/214 |

\* cited by examiner

ACOUSTIC PANEL

This invention claims the benefit of UK Patent Application No. 1209658.2, filed on 31 May 2012, which is hereby incorporated herein in its entirety.

FIELD OF THE INVENTION

The present disclosure relates to an acoustic panel

In particular, it relates to acoustic panels which are used in the construction of liners for fan, combustion, turbine and exhaust ducts of gas turbine engines to reduce noise and vibration.

BACKGROUND TO THE INVENTION

It is known to provide acoustic liners in fan and other casings to reduce noise generated by the engine during operation. Typically they comprise acoustically resistive layers (i.e. layers which filter out particular wavelengths) above honeycomb cavities. Typical configurations consist of one or more resistive layers, backed respectively by one or more honeycomb cavities. Those with one resistive layer and one honeycomb layer are known as single layer liners, while those with two honeycomb layers separated by an acoustically resistive septum layer are known as double layer liners. These liners are tuned to attenuate noise within a range of frequencies.

Modern engines may produce noise in more than one distinct range of frequencies. For example core engine noise (i.e. due to combustion) may be in the range of about 200 Hz-630 Hz), and turbine noise may be in the range of 4000 Hz to 6300 Hz. To overcome this, liners tuned to different frequencies are provided at different locations downstream of the source of the noise. Hence one has the choice of either providing a substantial amount of the gas flow path with an acoustic liner in order to attenuate noise to a required level, and thus suffering a weight penalty due to the increased number of liner panels making up the liner and/or increased duct length to accommodate the acoustic panels, or employing few liner panels to keep weight low and thus risking an insufficient amount of attenuation.

Hence an acoustic liner panel which can attenuate noise over two or more distinct frequency ranges whilst being relatively compact is highly desirable.

STATEMENTS OF INVENTION

Accordingly there is provided an acoustic panel comprising a first cellular layer with cells having a first axis, a second cellular layer with cells having a second axis, and a perforated septum layer separating the first layer and the second layer, such that the cells of both layers have an end distal to the septum layer and an end which terminates at the septum layer, and the maximum diameter of the cells of the first layer is less than the maximum diameter of the cells of the second layer.

Accordingly there is also provided a casing which defines a gas flow path, the casing comprising: an acoustic panel as of the present disclosure, wherein the porous sheet defines, at least in part, the gas flow path, and the first axis of the first layer cells being substantially at an angle to the direction of the gas flow path.

Hence there is provided an acoustic liner panel which can attenuate noise over two or more distinct frequency ranges, thus allowing total liner duct length and nozzle weight to be reduced compared to conventional solutions.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

Examples of the present disclosure will now be described with reference to the accompanying drawings, in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
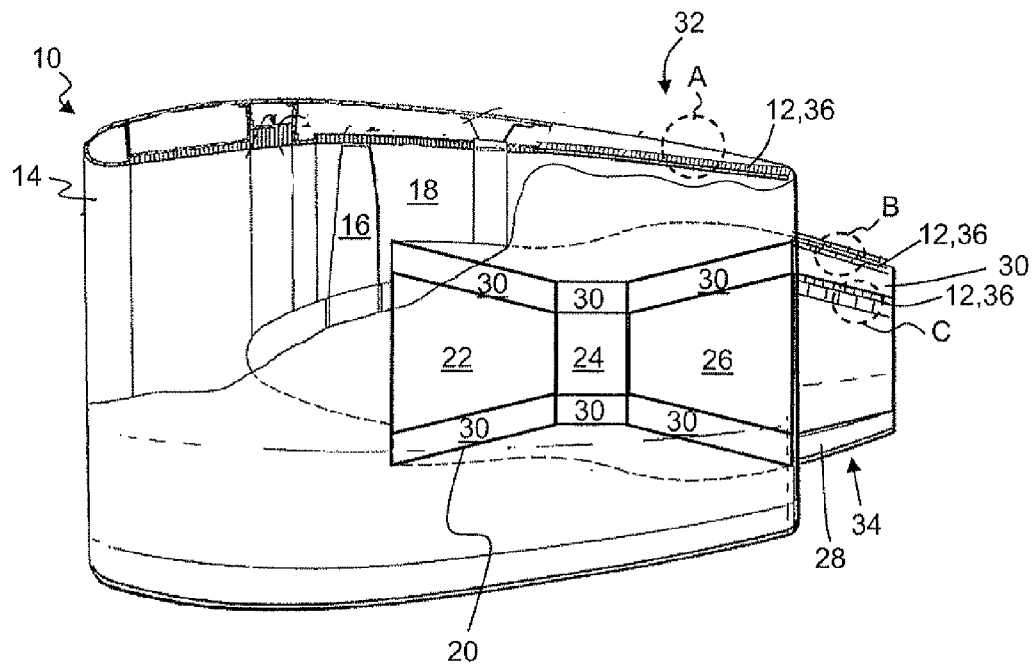
FIG. 1 shows a gas turbine engine provided with acoustic panels according to the present disclosure.

FIG. 1 shows a gas turbine engine 10 provided with acoustic panels 12 according to the present disclosure. The engine comprises an intake 14, a fan 16 and a bypass duct 18, as well as an engine core 20. The core 20 itself comprises a compressor section 22, combustor section 24, turbine section 26 and exhaust duct 28 which define a core flow path 30. The acoustic panels 12 of the present disclosure may be fitted to any of the flow surfaces of the bypass duct 18 or engine core flow path 30, but find particular efficacy in downstream sections 32, 34 of the bypass duct 18 and core flow path 30 respectively. That is to say the casings of the various engine sections, for example the compressor, combustor, turbine and exhaust duct, which define the gas flow paths through the engine 10 may comprise an acoustic panel 12 according to the present disclosure. The panels 12 may be located on either radially inner or radially outer surfaces which define the ducts and engine core flow path, or on both the radially inner or radially outer surfaces which define the ducts and engine core flow path.

The panels 12 make up a liner 36 which extends over a region of gas flow paths of the engine 10. That is to say, the liner 36 is made up of one or more panels 12. Apart from the acoustic panel 12 and liner 36, the engine 10 is of a conventional kind known to the skilled man, further details of which need not be described further.

Figure 2:
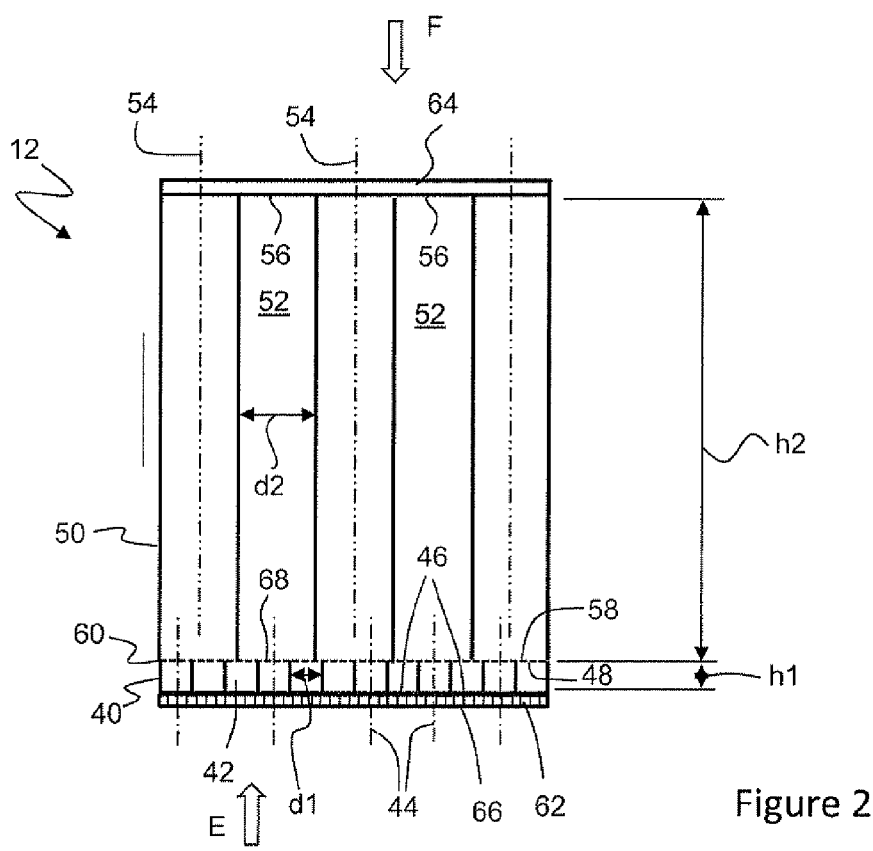
FIG. 2 is a cross sectional view taken through a liner panel as indicated by regions A, B and C circled in FIG. 1.

FIG. 2 shows an enlarged view of a section of an acoustic panel 12. The acoustic panel 12 comprises a first cellular layer 40 with cells 42 having a first axis 44. The panel 12 further comprises a second cellular layer 50 with cells 52 having a second axis 54. The axes 44, 54 of only some of the first and second layer cells 42, 52, are shown, for the sake of clarity. In the example shown in FIG. 2 the first and second axes 44, 54 are substantially aligned with one another. A perforated septum layer 60 separates the first layer 40 and the second layer 50, such that the cells 42, 52 of both layers 40, 50 have an end 46, 56 distal to the septum layer and an end 48, 58 which terminates at the septum layer 60.

The cells 42, 52 of the first cellular layer 40 and second cellular layer 50 have a substantially constant cross sectional area along their respective axes 44, 54. The distal end 46 of cells 42 of the first layer 40 are covered by a porous sheet 62, which may also be referred to as a "facing sheet". The porous sheet 62 provides acoustic resistance. The porous sheet 62 may be a layer of material provided with holes, a perforated sheet, a mesh or net like material, or a micro perforate material. The distal end 56 of the cells 52 of the second layer 50 are closed by an imperforate sheet 64.

The maximum diameter d1 of the cells 42 of the first layer 40 are less than the maximum diameter d2 of the cells 52 second layer 50. Hence the first cells 42 and second cells 52 are staggered relative to one another. They may be staggered by a regular distance, or an irregular distance.

When installed in the engine 10, the acoustic panel 12 is orientated such that the porous sheet 62 defines, at least in part, part of the gas flow path through the bypass duct 18 and/or the engine core flow path 30.

The first axis 44 of the first layer cells 42 is substantially at an angle to the direction of the gas flow path 18, 30. In the example shown in FIG. 2 first axis 44 of the first layer cells 42 is substantially perpendicular to the direction of the gas flow path 18, 30.

The panels may comprise a metal capable of resisting high temperatures, for example the temperature of the exhaust gas of the engine. By way of non limiting example, suitable materials include titanium alloys or nickel alloys. Alternatively the panels may be made from a Ceramic Matrix Composites (CMC).

In the example shown in FIG. 2, the ratio of first layer 40 cell maximum diameter d1 to second layer 50 cell maximum diameter d2 is substantially the same for all regions of the panel 12. The term "maximum diameter" is taken to mean the longest distance between tangents to opposite surfaces of a cell.

In the example shown in FIG. 2, the first layer cell 40 height hi is substantially different to the second layer 50 cell height h2. The term "height" is taken to mean the distance between the inner side of the sheets 62, 64 and the septum layer 60. In particular in the example shown in FIG. 2, the first layer 40 cell height h1 is substantially less than the second layer 50 cell height h2.

In the example shown in FIG. 2, the ratio of first layer cell height to second layer cell height h1:h2 is substantially the same for all regions of the panel 12, where the cell heights h1, h2 are substantially constant for all regions of the panel 12.

Figure 3:
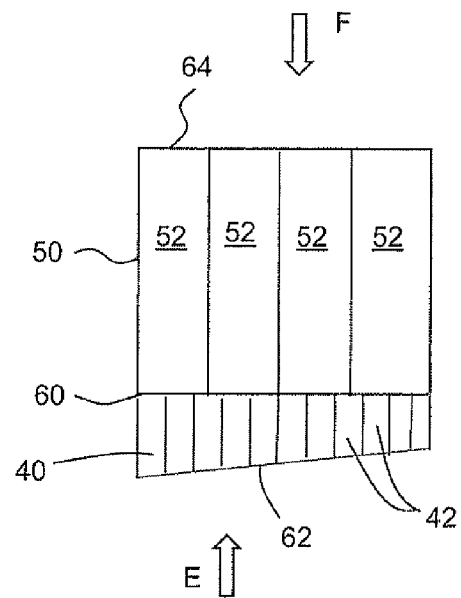
FIG. 3 shows a cross sectional view of an alternative example to that shown in FIG. 2.

In the example shown in FIG. 3 at least some of the first layer cells 42 have different heights h1 to one another. This may be done to aid integration into an engine structure. Although not shown in detail, panel 12 of FIG. 3 comprises a porous sheet 62, septum 60 and imperforate sheet 64 as described in relation to the example of FIG. 2.

Figure 4:
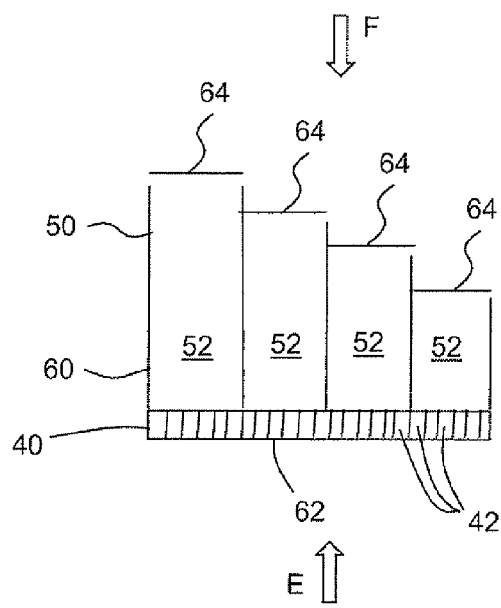
FIG. 4 shows a cross sectional view of a further example to that shown in FIG. 2 and FIG. 3.

Alternatively, in the example shown in FIG. 4 at least some of the second layer cells 52 have a different heights h2 to one another. Although not shown in detail, panel 12 of FIG. 4 comprises a porous sheet 62, septum 60 and imperforate sheet 64 as described in relation to the example of FIG. 2.

Figure 5:
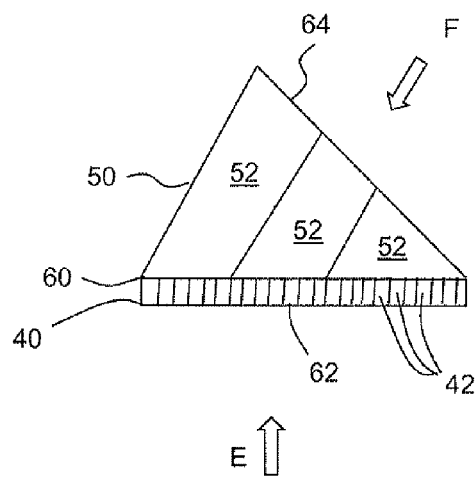
FIG. 5 shows a cross sectional view of an additional example to that shown in FIG. 2, FIG. 3 and FIG. 4.

In an alternative example shown in FIG. 5, the second axis 54 is at an angle to the first axis 44. This may be done to aid integration into an engine structure. Although not shown in detail, panel 12 of FIG. 5 comprises a porous sheet 62, septum 60 and imperforate sheet 64 as described in relation to the example of FIG. 2.

Figure 6:
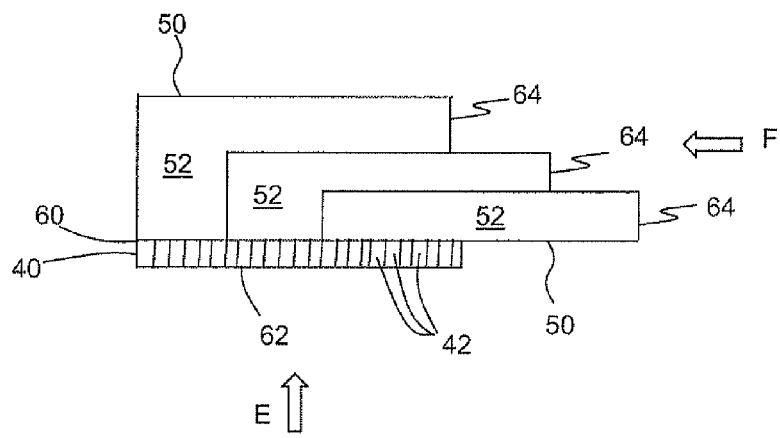
FIG. 6 shows a cross sectional view of a further alternative example to that shown in FIG. 2, FIG. 3, FIG. 4 and FIG. 5.

In a further alternative example shown in FIG. 6, at least some of the second cells comprise a substantially right angle bend such that they are "L" shaped in cross section along their central axis. This configuration is beneficial in minimising the overall panel height whilst still delivering the required attenuation. Although not shown in detail, panel 12 of FIG. 3 comprises a porous sheet 62, septum 60 and imperforate sheet 64 as described in relation to the example of FIG. 2.

Figure 7:
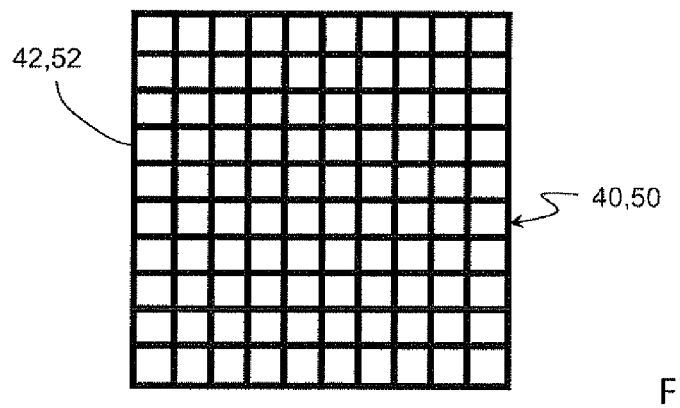
FIG. 7 shows a view of one example of the cells of the liner panels as viewed from the direction of arrows E, F in FIGS. 2 to 6.
Figure 8:
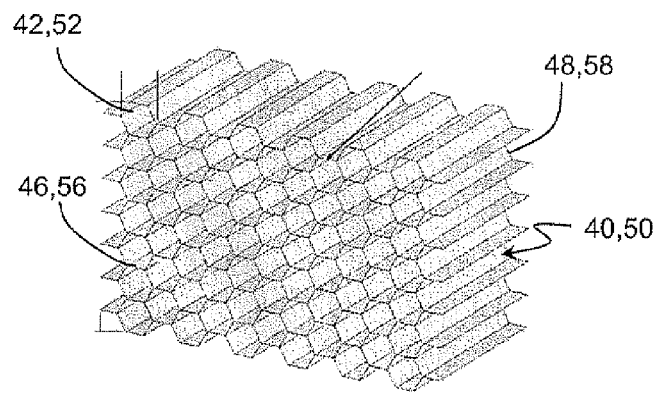
FIG. 8 shows an isometric view of an alternative example of the cells of the liner panels.
Figure 9:
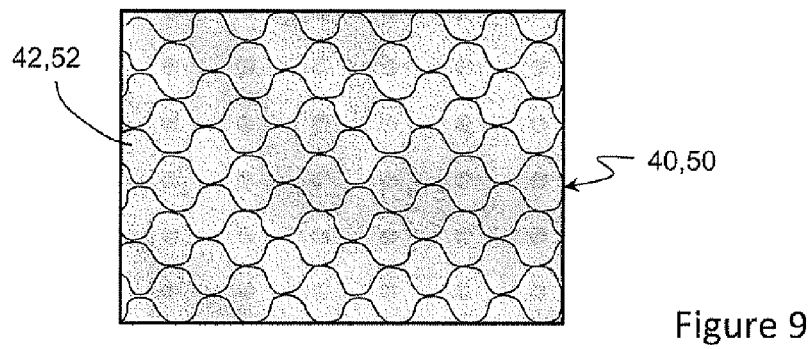
FIG. 9 shows a view of a further example of the cells of the liner panels as viewed from the direction of arrow E, F in FIGS. 2 to 6.

Each of the first and second cells 42, 52 may be substantially polygonal in cross section, for example rectangular, as shown in FIG. 7 which is a view as seen from the direction of arrow E or F through the porous sheet 62 or imperforate sheet 64 respectively in FIGS. 2 to 6. Alternatively each of the first and second cells 42, 52 may be substantially hexagonal, as shown in isometric view in FIG. 8. Alternatively they may have a curved cross-sectional shape, for example part circular as shown in FIG. 9 which is a view as seen from the direction of arrow E or F through the porous sheet 62 or imperforate sheet 64 respectively in FIGS. 2 to 6. The first cells 42 may have a different cross sectional shape to that of the second cells 52.

The maximum diameter d1 of the first layer cells 42 is no less than 5 mm and no more than 18 mm. This range of values will provide plane wave propagation in the first cells 42 up to about 10 KHz. The first layer cells height h1 may be no less than 13 mm and no greater than 38 mm. In an alternative example the first layer cells height h1 is no less than 5 mm and no greater than 26 mm. The maximum diameter of the second layer cells 52 is no less than 40 mm and no more than 500 mm. In one example the maximum diameter of the second layer cells 52 is no less than 160 mm and no more than 300 mm. In an alternative example the maximum diameter of the second layer cells 52 is no less than 40 mm and no more than 150 mm. This range of values will provide plane wave propagation for frequencies of less than ~1 KHz. The second layer cells height h2 is no less than 25 mm and no greater than 500 mm. In one example the second layer cells 52 height h2 is no less than 38 mm and no greater than 368 mm. Both the first and second cell heights may vary in the specified range.

In one example the porous sheet 62 is a perforated sheet, the perforations provided as holes having a diameter of at least 0.1 mm and no more than 2 mm. The perforated porous sheet 62 may be at least 0.5 mm thick, but no more than 1 mm thick, and may have an open area of at least 8% and no more than 12%. Alternatively the perforated porous sheet 62 has an open area of at least 8% and no more than 10%.

The perforate septum layer 60 has an open area of at least 5% and no more than 20%. The perforations in the septum layer 60 are provided as holes 68 having a diameter of at least 1 mm and no more than 5 mm. In one example the perforations 68 in the septum layer 60 are provided as holes 68 having a diameter of at least 2 mm and no more than 4 mm. A relatively large hole diameter is preferred, as this promotes a high septum reactance needed to close off the septum at high frequencies, without adding significant weight, or adding undesirable acoustic resistance at low frequencies. The septum layer 60 is at least 0.5 mm thick, but no more than 1.5 mm thick.

The imperforate sheet 64 is rigid and configured to reflect acoustic energy.

The total panel acoustic resistance varies with the individual layer acoustic resistance, cell depths, noise frequency, Mach number of air flow moving tangentially along the surface of the panel (sometimes referred to as "grazing flow"), and Sound Pressure Level (SPL). However, it can be defined for a given frequency and engine power setting. For example one desirable value of total panel acoustic resistance is less than 1 pc below 1000 Hz at Approach Power conditions (where "Approach" is the engine condition for use in an aircraft just prior to landing), and in the range of 0.5 pc to 2 pc between 4 KHz and 6.3 KHz at Take-Off Power conditions (where "Take Off" is the engine condition for use in an aircraft to achieve take off from the ground). In this context p is air density and c is the speed of sound.

During operation gas flows along the flow paths of the engine 10 and over the porous sheet 62. Noise generated by the operation of the engine 10 is transmitted through the gas. Turbine noise is generally predominant at high engine power settings and tends to be of relatively high frequency (for example in the range of 4000 Hz to 6300 Hz). In the configurations described above, the first layer cells 40 will attenuate noise at higher frequencies (for example in the range of 4000 Hz to 6300 Hz). Combustion noise is generally predominant at low engine power settings and tends to be of a relatively low frequency (<1 KHz). The first cellular layer 40 and second cellular layer 50 in combination will attenuate noise at lower frequencies (for example less than 1 KHz, and in particular in the range of 200 Hz-630 Hz).

The porous sheet 62 is thus beneficial because its grazing flow resistance is low at low engine power settings (i.e. low grazing flow Mach numbers), where low acoustic resistances are optimum for attenuation of combustion noise, and the grazing flow resistance component increases at high power settings (high grazing flow Mach numbers), where higher resistances are optimum for turbine noise attenuation. That is to say the grazing flow resistance characteristics of a porous sheet 62 herein defined enable the tuning of the panel 12 both at low frequency-low Mach number and at high frequency-high Mach number.

The combination of open area, hole diameter and thickness of the septum layer, as herein defined, will provide an inertance and a reactance characteristic which effectively closes off the second layer 50 at high frequencies. That is to say, at low frequencies the panel response is governed primarily by the total height of the first layer 40 and second layer 50, while at high frequencies the septum reactance, being proportional to frequency and configured to have a large inertance, increases substantially to effectively close off the second layer 50, leaving the panel acoustic response defined primarily by the height of the first layer 40.

In the example shown in FIG. 3, where the first layer cells 40 vary in height, the high frequency performance of the panel 12 will be towards specific frequencies. That is to say, it will tend to attenuate noise having a higher frequency than the example shown in FIG. 2.

In examples where the heights h1, h2 vary between regions of the panel 12, as shown in FIGS. 3 to 5, the tuning of the liner 36 will be effectively "smeared" over the target frequency range. That is to say, the liner 36 will attenuate a different range of noise frequencies at different regions of the panel 12. Such a configuration will thus attenuate a larger range of frequencies than the example shown in FIG. 2.

Hence there is provided an acoustic liner panel 12 which can attenuate noise over two or more distinct frequency ranges, thus allowing total liner duct length and nozzle weight to be reduced compared to conventional solutions. The panel 12 of the present disclosure is configured so that it "closes off" at high frequency (for example in response to turbine noise), and works efficiently at low frequencies (for example for combustion noise).

Although the device of the present disclosure is described with reference to turbo machinery, and in particular a gas turbine engine, acoustic panels according to the present disclosure may be used in any application where effective low frequency attenuation is the prime design driver, but where attenuation at much higher frequencies is also desirable.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. An acoustic panel comprising
a first cellular layer with cells having a first axis,
a second cellular layer with cells having a second axis,
and a perforated septum layer separating the first layer and the second layer, wherein
the cells of both layers have an end distal to the septum layer and an end that meets the septum layer,
the maximum diameter of the cells of the first layer is less than the maximum diameter of the cells of the second layer, and
the septum layer is at least 0.5 mm thick, but no more than 1.5 mm thick, the septum layer has an open area of at least 5% and no more than 20%, and the perforations in the septum layer are provided as holes having a diameter of at least 1 mm and no more than 5 mm.

2. The acoustic panel as claimed in claim 1 wherein the cells of the first cellular layer and second cellular layer have a substantially constant cross sectional area along their respective axes.

3. The acoustic panel as claimed in claim 1 wherein the distal end of the cells of the first layer is covered by a porous sheet.

4. The acoustic panel as claimed in claim 1, wherein the distal end of the cells of the second layer is closed by an imperforate sheet.

5. The acoustic panel as claimed in claim 1 wherein the ratio of first layer cell maximum diameter to second layer cell maximum diameter is substantially the same for all regions of the panel.

6. The acoustic panel as claimed in claim 1 wherein the first layer cell height is substantially different to the second layer cell height.

7. The acoustic panel as claimed in claim 6 wherein the first layer cell height is less than the second layer cell height.

8. The acoustic panel as claimed in claim 1 wherein at least some of the first layer cells have different heights to one another.

9. The acoustic panel as claimed in claim 1 wherein at least some of the second layer cells have different heights to one another.

10. The acoustic panel as claimed in claim 1 wherein the first and second axes are substantially aligned with one another.

11. The acoustic panel as claimed in claim 1 wherein the second axis is at an angle to the first axis.

12. The acoustic panel as claimed in claim 1 wherein at least some of the second cells comprise a substantially right angle bend such that they are "L" shaped in cross section along their central axis.

13. The acoustic panel as claimed in claim 1 wherein each of the cells is substantially polygonal.

14. The acoustic panel as claimed in claim 1 wherein the maximum diameter of the first layer cells is no less than 5 mm and no more than 18 mm.

15. The acoustic panel as claimed in claim 1 wherein the first layer cells height is no less than 13 mm and no greater than 38 mm.

16. The acoustic panel as claimed in claim 1 wherein the first layer cells height is no less than 5 mm and no greater than 26 mm.

17. The acoustic panel as claimed in claim 1 wherein the maximum diameter of the second layer cells is no less than 40 mm and no more than 500 mm.

18. The acoustic panel as claimed in claim 17 wherein the maximum diameter of the second layer cells is no less than 160 mm and no more than 300 mm.

19. The acoustic panel as claimed in claim 17 wherein the maximum diameter of the second layer cells is no less than 40 mm and no more than 150 mm.

20. The acoustic panel as claimed in claim 1 wherein the second layer cells height is no less than 25 mm and no greater than 500 mm.

21. The acoustic panel as claimed in claim 20 wherein the second layer cells height is no less than 38 mm and no greater than 368 mm.

22. The acoustic panel as claimed in claim 3 wherein the porous sheet is a perforated sheet, the perforations provided as holes having a diameter of at least 0.1 mm and no more than 2 mm.

23. The acoustic panel as claimed in claim 22 wherein the porous sheet is at least 0.5 mm thick, but no more than 1 mm thick.

24. The acoustic panel as claimed in claim 22 wherein the porous sheet has an open area of at least 8% and no more than 12%.

25. The acoustic panel as claimed in claim 22, wherein the porous sheet has an open area of at least 8% and no more than 10%.

26. The acoustic panel as claimed in claim 1 wherein the perforations in the septum layer are provided as holes having a diameter of at least 2 mm and no more than 4 mm.

27. The acoustic panel as claimed in claim 1 wherein the septum layer prevents propagation therethrough of acoustic waves having a frequency of greater than approximately 2 kHz.

28. A casing which defines a gas flow path, the casing comprising:
an acoustic panel as claimed in claim 1,
wherein the porous sheet defines, at least in part, the gas flow path, and
the first axis of the first layer cells being substantially at an angle to the direction of the gas flow path.

29. The casing as claimed in claim 28 wherein the first axis of the first layer cells are substantially perpendicular to the direction of the gas flow path.

30. The casing as claimed in claim 28 wherein the casing comprises at least part of a compressor section for a turbomachine.

31. The casing as claimed in claim 28 wherein the casing comprises at least part of a combustor section for a turbomachine.

32. The casing as claimed in claim 28 wherein the casing comprises at least part of a turbine section for a turbomachine.

* * * * *